Feb. 4, 1969  E. D. KNECHTEL ET AL  3,425,272
TWO-FORCE-COMPONENT MEASURING DEVICE
Filed Aug. 19, 1966                                    Sheet 2 of 2
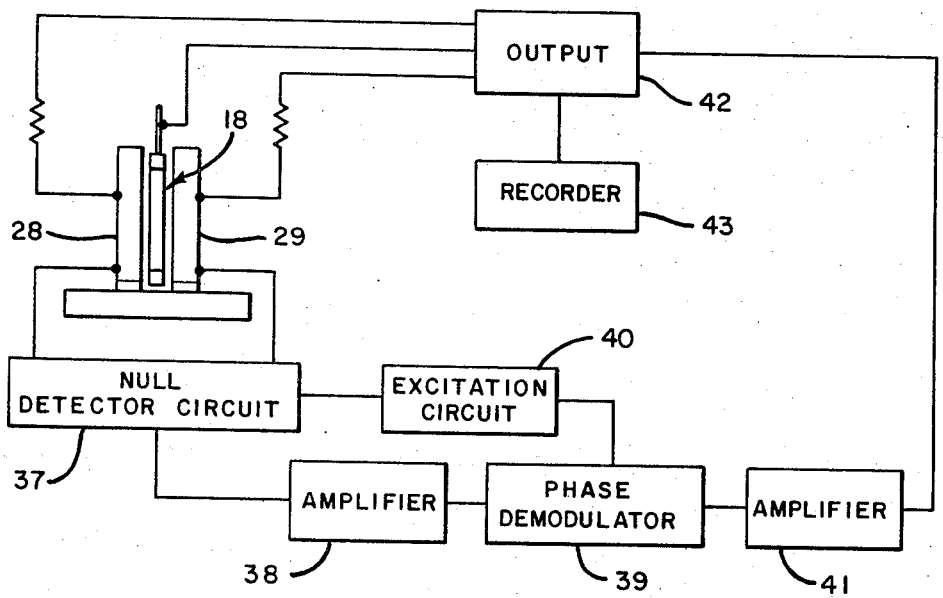
FIG-4
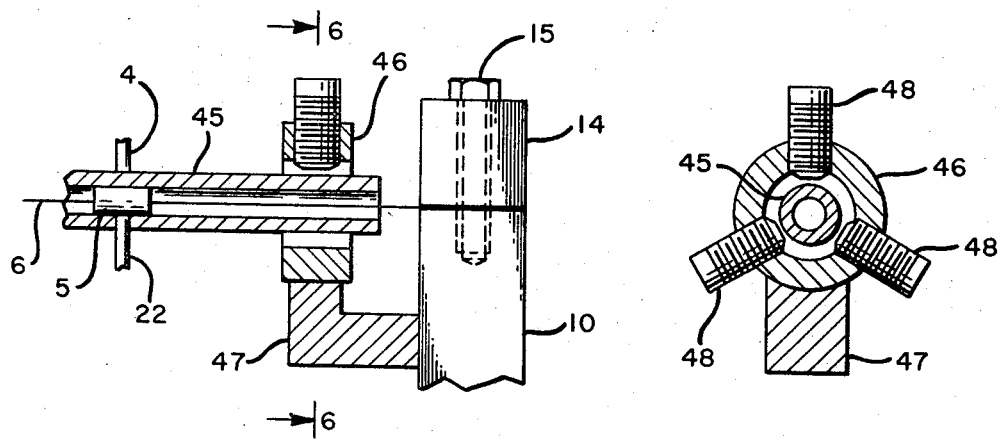
FIG-5                    FIG-6
INVENTORS
EARL D. KNECHTEL
WILLIAM C. PITTS
BY
ATTORNEYS United States Patent Office 3,425,272
Patented Feb. 4, 1969

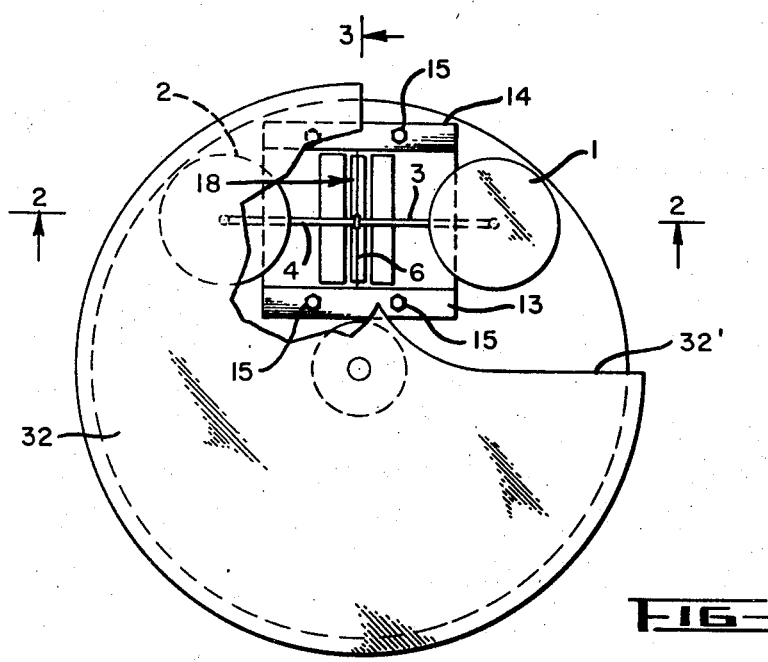
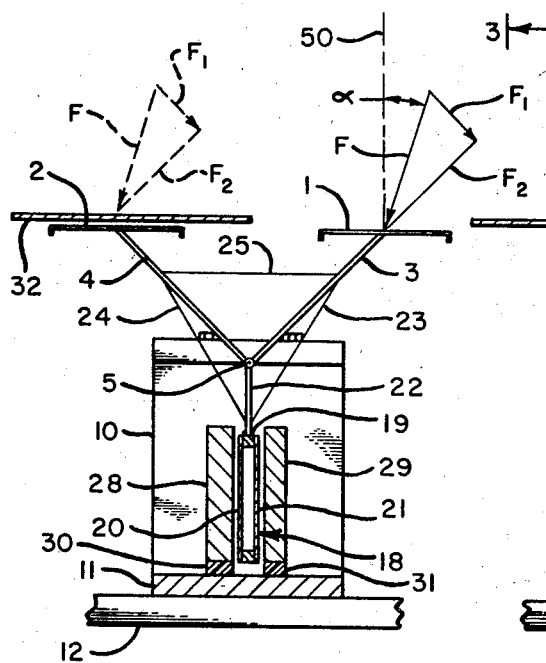
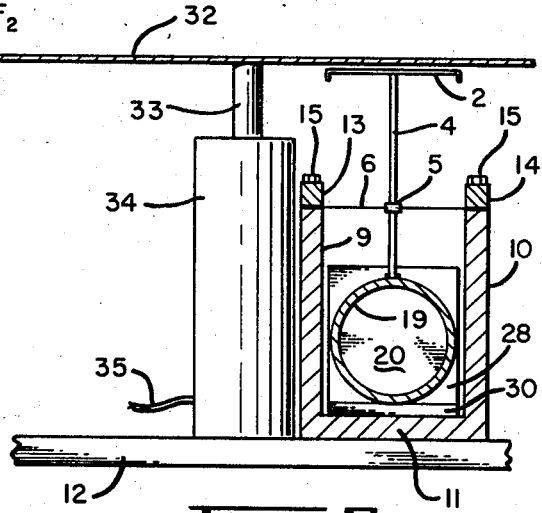

3,425,272
TWO-FORCE-COMPONENT MEASURING DEVICE
Earl D. Knechtel, Mountain View, and William C. Pitts, San Jose, Calif., assignors to the United States of America as represented by the Administrator of the National Aeronautics and Space Administration
Filed Aug. 19, 1966, Ser. No. 574,290
U.S. Cl. 73—142                                                                                      13 Claims
Int. Cl. G01e 5/12

ABSTRACT OF THE DISCLOSURE

A measuring device which separately measures the two vector components of a test force. Two force targets are pivotally balanced about a single axis of rotation. Each target is alternately exposed to the two-component test force. One target is deflected by only the first component. The other target is deflected by only the second component. A nulling system coupled to the targets imparts a restoring force when a particular target is deflected. The magnitude of the restoring force is a direct function of the particular force component.

---

The invention described herein may be manufactured and used by or for the Government of the United States of America for governmental purposes without the payment of any royalties thereon or therefor.

This invention relates to devices for measuring force, and more particularly to devices for measuring two components of a force which is directed against its force-measuring target at an angle thereto.

In the fields of modern technology there is a need for a device which will measure more than one component of a force. It is not always possible to orient the target of a force measuring balance so that it will be exactly normal to the line of application of the force to be measured. Thus, unless the angle of the impinging force is known, it will not be possible to determine whether the measured force is a force of given magnitude directed normal to the target or a force of much larger magnitude directed at some angle to the target. One of the modern areas which needs improved force measuring apparatus is the field of space travel where it is necessary to measure the two orthogonal components of the force of ambient atmospheric molecules bombarding the target of the measuring device mounted on a satellite.

Accordingly, it is an object of the present invention to provide a force measuring device which will measure two components of the force when it is directed at an angle to the measuring target.

Another object of the invention is to provide a two-force-component measuring device which is particularly adapted for use aboard satellites. More specifically, one feature of this object of the invention is to provide a two-force-component measuring device which does not require a gravity load to balance the applied load and which does not require the force of gravity for any other purpose, such as to provide stability. Another feature of the object of this invention is to provide a device which is rugged enough to withstand the launch loads encountered in a satellite mission. A further object of the invention is to provide a two-force-component measuring device which is automatically self-nulling.

An additional object of the invention is to provide a two-force-component measuring device in which either of two targets can be exposed while the other is shielded, and also wherein both targets can be shielded simultaneously to obtain a zero or null calibration for the device.

By way of brief description, a preferred embodiment of a two-force-component measuring device made in accordance with the invention comprises a pair of target discs. Each of the discs is mounted on the free end of one arm of a Y-shaped support structure. The Y-shaped structure in turn is mounted at its intersection on a taut torsion fiber so that the fiber provides a pivot axis for each of the targets. The center disc of a three-disc capacitor is mounted on the free end of the third one of the arms which form said Y-shaped structure. The other two discs of the capacitor are stationary on opposite sides of the movable capacitor disc so that when the device is in its null position the movable disc is exactly centered between the two stationary discs. A movable partial cover is provided for the device which will completely shield one target from impinging molecules while the other is fully exposed to the force of the impinging molecules. As will be understood by those skilled in the art, the geometry of the Y-shaped structure is such that the component of force which is directed along the arm which supports the particular target does not cause any turning moment around the axis formed by the torsion fiber, and therefore does not cause any movement of the movable capacitor plate. However, the component of the force which is normal to the supporting arm will be fully effective to cause a turning moment about the pivot axis and will be fully measured by the D.C. voltage required to maintain the movable capacitor plate in the null position. Then, if the two supporting arms for the targets are arranged at 90° to each other, the two-force components measured by the two identical targets will be the orthogonal components; that is, the component measured by one target will be the component which is 90° to the component measured by the other target.

The various objects and features of advantage of the invention will become more apparent from the following detailed description wherein reference is made to the accompanying drawings in which:

FIGURE 1 is a top plan view of a preferred embodiment of the invention with part of the cover plate cut away.

FIGURE 2 is a cross-sectional view taken on the line 2—2 to FIGURE 1.

FIGURE 3 is a cross-sectional view taken on the line 3—3 of FIGURE 1.

FIGURE 4 is a schematic view showing a representative nulling and recording circuit.

FIGURE 5 is a view on enlarged scale showing a modified embodiment of the invention, and FIGURE 6 is a cross-sectional view on the line 6—6 of FIGURE 5.

Referring in more detail to the drawings, the two-force-component measuring device comprises a pair of identical targets 1 and 2. As in the case of prior art devices which measure only one component of an impinging force, the targets may be made of any suitable material for which the gas-surface interaction forces are to be found. For reference purposes, however, the targets are preferably made with a surface which is fully absorbing, employing any conventional construction for this purpose. For example, the targets can be made with a surface having a plurality of extremely sharp close-spaced ridges, further roughened as by being made of aluminum and then anodized, and finally coated with a black dye. The targets 1 and 2 are rigidly connected to supporting arms 3 and 4 as by soldering. The inner ends of the arms 3 and 4 are interconnected by being soldered to a small hub 5. The hub 5 is drilled to receive a torsion fiber 6 to which it is rigidly secured as by soldering or crimping so that when the targets 1 and 2 move, the torsion fiber 6 will move also. It will be seen that the torsion fiber 6 provides a single or common pivot axis about which both of the targets 1 and 2 can pivot.

The torsion fiber 6 is mounted on a pair of support plates 9 and 10 which can be integral with a bottom block 11 so that the plates 9 and 10 are rigidly held a fixed distance apart. The U-shaped mounting structure 9–11 can in turn be rigidly attached to a base plate 12. In order to support the targets 1 and 2 in proper manner, the torsion fiber 6 must be stretched very taut. The fiber 6 can be stretched by any conventional tensioning equipment and then clamped in place by means of clamping blocks 13 and 14 secured to the tops of the supporting plates 9 and 10 by means of screws 15. Alternatively the torison fiber 6 can be attached to the supporting plates 9 and 10 by any conventional type of built-in tension adjusting means. The torsion fiber 6 is preferably made of stainless steel. In practice, non-magnetic stainless steel is a preferred material for substantially all parts of the device, one possible exception being the targets, which may be of various materials, as noted previously, but preferably non-magnetic. The main point is that it is very important that the device not be magnetic so that it will not be affected by magnetic forces.

The torsion fiber 6 is of such small diameter that it presents substantially no resistance to pivotal movement of the targets, at least for the very small amount of movement with which we are concerned. In order to resist the movement of the targets so that they will be returned to a null position and in order to measure the force causing such deflection, a movable capacitor plate 18 is provided. The movable capacitor plate 18 is preferably constructed in the form of drum having a metal ring member 19 on which are stretched two thin metal sheets 20 and 21. The sheets 20 and 21 are spot-welded, or otherwise secured in place to form the finished composite capacitor plate 18. The reason for making a composite structure is to provide a capacitor plate which will be extremely light and yet will be strong enough to provide a perfectly planar surface on each side thereof. In order to connect the movable capacitor 18 to the targets 1 and 2, the capacitor plate is mounted on an arm 22 which is in turn connected to the hub 5 so that an integral Y-shaped structure is formed by the arms 3, 4 and 22. In order to rigidify the Y-shaped structure, tension wires 23, 24 and 25 are secured to the arms 3, 4 and 22.

In order to complete the capacitor structure, a pair of stationary capacitor plates 28 and 29 are rigidly mounted on opposite sides of the movable capacitor plate 18. The plates 28 and 29 are mounted on the bottom portion 11 of the U-shaped member which supports fiber 6. The metal plates 28 and 29 can be attached by screws or by brazing to the metal member 11 which in turn can be attached by screws or brazing to the metal base plate 12. In order to make plates 28 and 29 electrically separate, the bottom portions thereof are made of a dielectric as indicated at 30 and 31. The dielectric strips 30 and 31 can be made of a material such as ceramic which can be metalized and then brazed to the plates 28 and 29 and to the member 11. The arrangement is such that when the measuring device is in its null position the movable capacitor plate 18 is exactly centered between the stationary capacitor plates 28 and 29, and the two target discs 1 and 2 are parallel to the base plate 12.

If both of the targets 1 and 2 were simultaneously subjected to the same force, it would not be possible to measure the components of the force. For example, if the force were normal to the targets 1 and 2, the turning moment of each target about the torsion fiber 6 would be exactly the same in magnitude, and since the turning moments would be opposite in direction, the device would incorrectly give a zero force measurement. If the direction of the force against the targets is at an angle to normal, the turning moments from the two targets will not be the same, and therefore the measuring device will record a force. However, it will not be possible to tell whether the actual force is a large force arriving in a direction which forms only a small angle with the normal, or whether it is a smaller force arriving at a larger angle to normal. For example, if a force arrives at 45° to normal it will be aligned with one of the support arms 3 or 4, and that support arm will therefore transmit no turning moment to the torsion fiber. As a result, the full magnitude of such a force will be measured because one target will not counteract the other. On the other hand, if the direction of the force is very close to normal only a very small percentage of the actual force will be measured because the two targets will substantially counteract each other. Thus, in order to obtain full operation of the measuring device, it is necessary to be able to shield one target from the force being measured while the other target is exposed to the force. The way in which this is accomplished in the preferred embodiment is by means of a cover disc 32 having a cutout portion $32^1$. The cutout portion is so arranged that when it is positioned over one target the solid portion of the cover 32 will be positioned over the other target. In addition, the cutout portion is made small enough so that the cover 32 can be positioned to cover both of the targets 1 and 2 simultaneously. When both of the targets are shielded from any impinging force, the zero or null calibration for the measuring device can be checked. The cover 32 is mounted on the drive shaft 33 of a conventional stepping motor 34 having an electrical lead 35. In this way the cover 32 can be selectively positioned to shield either of the targets while exposing the other, or positioned to shield both of the targets simultaneously. In other words, the stop positions for the motor are arranged to coincide with the stated selective positions for the cover.

As shown in FIGURE 4, a conventional electrical circuit is connected to the three capacitor plates in order to detect motion of the movable capacitor plate 18, and to restore the movable capacitor plate to its center or null position. More specifically, the electrical circuit comprises a null detector circuit 37, an amplifier 38, a phase demodulator 39, an excitation circuit 40, an amplifier 41, a driving voltage output 42 and a recorder 43, all of which are of conventional construction. Thus, when the movable capacitor plate 18 moves either left or right, as viewed in the drawings, this deflection is detected by the null detector circuit 37. The phase demodulator 39 determines the direction of the deflection, and the output 42 provides a D.C. voltage to the stationary or driving capacitors 28 and 29 to renull the device. The output 42 also relays to the recorder 43 the balance nulling voltage which after calibration can, of course, be transcribed directly as a force.

In conditions of service where extreme acceleration loads are encountered, it is possible to make the device more rugged as shown in the modification of FIGURES 5 and 6. More specifically, a tube 45 is mounted securely on the hub 5 for movement as a unit therewith. The tube 45 extends nearly to the support plate 10, as shown in FIGURE 5, and is received in a ring 46. The ring 46 is mounted on a support bracket 47 which is attached to the support plate 10. Movement-limiting stop screws 48 are threaded in the ring 46 for movement-stopping abutment with the tube 45. In order to complete the rigidifying arrangement, it is, of course, desirable to have the same abutment ring and screw arrangement on the left of hub 5, as is shown on the right thereof in FIGURE 5.

One of the intended uses for the apparatus described herein is on board a satellite and exposed to the atmosphere through which the satellite is traveling. Thus, whatever particles are in the atmosphere, such as gas molecules, will strike whichever of the targets is exposed. The force of the continuously impinging particles on target 1 will cause the target to rotate clockwise, as viewed in FIGURE 2. The voltage required to null the effects of the force will be recorded on recorder 43 and can be translated through previous calibration into a measurement of a force. The force which is measured, however, is not the full force shown by the solid line F in FIGURE 2, but rather the component $F_1$, when the force F is being applied to the target 1. The component $F_2$ is not detected since it is directed along the arm 3 directly toward the torsion fiber 6 and therefore gives no null-disturbing torque. In other words, the line of the force component $F_2$ intercepts the pivot axis and therefore has a zero moment arm. It will be understood that in actuality the impinging particles will be striking all over the target 1, and the vector F merely represents the summation of all of the individual particle forces. Thus, when target 1 is exposed, we obtain a force reading which we know to be the force $F_1$. Now, if we move the cover 32 so that target 1 is shielded and target 2 is exposed, we will get the force diagram shown in dashed lines in FIGURE 2. More specifically, the force on target 2 will cause the target to pivot counterclockwise about the torsion fiber 6 and the recorder 3 will give a reading which can be translated into a force which we know must be the force $F_2$. The force $F_1$ will, of course, impart no turning moment to the target 2 because the direction of the force $F_1$ is along the arm 4, and thus when transmitted from the target 2 to the arm 4 the force $F_1$ will intercept the pivot axis formed by the fiber 6 and will therefore have a zero moment arm. Thus, by measuring the effect of the force F on first one target and then the other, the device can measure the two orthogonal components $F_1$ and $F_2$. Then, by simple trigonometry, it is possible to calculate the magnitude of the force F, and its angle $\alpha$ with respect to the line 50 which is normal to the targets. Specifically:

$$F=\sqrt{F_1^2+F_2^2}$$

and $$\alpha= \tan^{-1}\left(\frac{F_2-F_1}{F_2+F_1}\right)$$

It will, of course, be understood that the atmosphere in which the measurements are taken is a substantially homogeneous atmosphere so that the force F which bombards target 1 at one short period of time will be the same force F which bombards target 2 at the next short period of time when the cover plate 32 has been moved to cover target 1 and uncover target 2. It will also be understood that direct measurement of the exactly orthogonal force components $F_1$ and $F_2$ requires that a line from the center of target 1 through the axis of torsion fiber 6 is at 90° to a line from the center of target 2 through the axis of the torsion fiber. In the embodiment shown in the drawings this means that arms 3 and 4 intersect at 90°. Arms 3 and 4 could be arranged to intersect at angles other than 90°, but the calculations would be much more complicated. Also, in order to obtain the condition which provides the greatest simplicity for making the desired force and angle measurements, the arms 3 and 4 are equal in length and the targets 1 and 2 are mounted to be coplanar, as shown in the drawings.

By way of example, the ability to calculate two orthogonal components of an impinging force will permit the calculation of information which simply cannot be calculated from the output of a conventional balance which measures only a single component of force. Thus, the pitch and yaw attitudes of a satellite can be calculated by using two of the devices according to the invention, arranged at right angles to each other, or by using only one device and measuring yaw when the pitch is known to be zero or vice versa. Also, since the total force F can be obtained, the local atmosphere's density can be calculated where the velocity of the vehicle is known and the target surfaces are of the fully absorbing type. Further, after the density is calculated, the altitude can be obtained from the known relation between density and altitude. In addition, since the angle $\alpha$ and the full force vector F can be obtained, simultaneously for a surface of unknown accommodation characteristics and a fully accommodating reference surface, the momentum accommodation coefficients for the desired target surfaces can be calculated.

Although specific details of the present invention are shown and described herein, it is to be understood that modifications may be made therein without departing from the spirit and scope of the invention as set forth in the appended claims.

What is claimed is:

1. Apparatus for separately measuring the first and second components of a force having two components comprising first and second force targets, support means interconnecting said targets and supporting both of said targets for pivotal movement about a single axis, means for alternately exposing each target to said two-component force, said first target, when exposed to said two-component force, being deflected counterclockwise an amount proportional to only said first component, said second target, when exposed to said two-component force being deflected clockwise an amount proportional to only said second component, a single nulling means responsive to said deflections for applying a restoring force to said support means when each target is deflected, the magnitude of said restoring force being a measure of the respective component force.

2. Apparatus as claimed in claim 1 in which said support means comprise a taut torsion fiber which both supports said targets and forms said pivot axis.

3. Apparatus as claimed in claim 1 in which said support means comprise a taut torsion fiber which both supports said targets and forms said pivot axis, and said targets are so supported on said fiber that lines through the centers of the two targets and the axis of the torsion fiber intersect each other at 90°.

4. Apparatus as claimed in claim 1 in which said nulling means comprises a capacitor electrode secured to said interconnected targets for movement therewith around said pivot axis, and a stationary capacitor electrode on each side of said movable electrode.

5. Apparatus as claimed in claim 1 in which said exposing means comprises a cover over said targets having an opening at least as large as one of said targets, means for pivotally supporting said cover on an axis normal to said single axis and between said targets so that when said cover is pivotally positioned to shield one of said targets the opening in the cover exposes the other of said targets.

6. Apparatus as claimed in claim 1 in which said support means comprises a taut torsion fiber which both supports said targets and forms said pivot axis, and stop means for limiting vibratory movement of said fiber.

7. Apparatus as claimed in claim 1 in which said support means comprises three arms arranged in a Y-shaped structure, said targets being connected to the free ends of two of said arms, said Y-shaped structure being mounted on a torsion fiber stretched taut between two fixed mounting members and forming said single pivot axis, said Y-shaped structure being so positioned on said fiber that the axis of the fiber passes through the intersection of the arms of the Y-shaped structure, and said nulling means comprising a first capacitor electrode connected to the free end of the third one of said arms, and a fixed capacitor electrode mounted on each side of said first capacitor electrode.

8. Apparatus as claimed in claim 7 in which said two target arms intersect at an angle of 90°.

9. Apparatus as claimed in claim 7 further comprisin an abutment tube connected to said Y-shaped structure and surrounding said torsion fiber, and fixed stop means surrounding said tube to limit lateral displacement of said torsion fiber.

10. Apparatus as claimed in claim 8 further comprising three lengths of wire interconnecting said three arms to rigidify the Y-shaped structure.

11. Apparatus for measuring a two-component force comprising first and second force targets, a frame interconnecting said targets, means for rotatably supporting said frame and targets for rotation about a single axis, means for alternately exposing said targets to a force having first and second components, said first component of force causing said first target to rotate counterclockwise about said axis, said first target geing insensitive to said second component, said second component of force causing said second target to rotate clockwise about said axis, said second target being insensitive to said first component, nulling means coupled to said frame for imparting a restoring force to said frame when said force rotates said frame, the magnitude of said restoring force being a direct function of the particular force component rotating the frame.

12. Measuring apparatus for measuring a two-component force comprising a Y-shaped member having first, second and third arms and an intersection portion where the arms are interconnected, two supports, a fiber fastened in tension between said supports, first and second targets connected to the extremities of said first and second arms, respectively, said member being secured to said fiber at said intersection portion, said fiber forming a pivot axis for said targets, and means for selectively exposing one of said targets to a force having first and second components, whereby when said first target is exposed to said two components of force, said first target is deflected only by said first component, and when said second target is exposed to said two components of force, said second target is deflected only by said second component, nulling means coupled to said third arm for imparting a restoring force to said member when a target is deflected by said force, the magnitude of said restoring force being a direct function of the force component deflecting the particular target.

13. A transducer for measuring forces with two components comprising first and second force targets, support means interconnecting said targets and supporting both of said targets for pivotal movement about a single axis, said support means comprising a member having first, second and third arms, each of said arms having an outer end and an intersection end, said arms being joined at their intersection ends, two supports, a fiber strung in tension between said two supports, said fiber forming said pivot axis, said member being secured to said fiber at the intersection point of said three arms, said first and second targets being connected to said outer ends of said first and second arms, respectively, means for alternately exposing each target to a force having first and second components, a first capacitor electrode fastened to the outer end of said third arm, second and third capacitor electrodes rigidly mounted on opposite sides of said first electrode, said first target, when exposed to said force, being deflected about said axis an amount proportional only to said first component, said second target, when exposed to said force, being deflected an amount proportional only to said second component, said deflections causing the capacitance between said electrodes to alter, the magnitude of said capacitance being a measure of said force components.

References Cited

UNITED STATES PATENTS 3,224,263   12/1965   Rogallo _____ 73—142

RICHARD C. QUEISSER, *Primary Examiner.*

VICTOR J. TOTH, *Assistant Examiner.*